United States Patent
Belluomini et al.

(10) Patent No.: US 8,645,619 B2
(45) Date of Patent: *Feb. 4, 2014

(54) OPTIMIZED FLASH BASED CACHE MEMORY

(75) Inventors: Wendy A. Belluomini, San Jose, CA (US); Binny S. Gill, Shrewsbury, MA (US); James L. Hafner, San Jose, CA (US); Steven R. Hetzler, Los Altos, CA (US); Eyal Lotern, Pardes Hana, IL (US); Venu G. Nayar, San Jose, CA (US); Assaf Nitzan, Haifa, IL (US); Edi Shmueli, Haifa, IL (US); Daniel F. Smith, Felton, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/553,194

(22) Filed: Jul. 19, 2012

(65) Prior Publication Data

US 2012/0297127 A1   Nov. 22, 2012

Related U.S. Application Data

(63) Continuation of application No. 13/112,894, filed on May 20, 2011.

(51) Int. Cl.
 *G06F 12/00* (2006.01)
(52) U.S. Cl.
 USPC .......................... 711/103; 711/113; 711/137
(58) Field of Classification Search
 USPC ......................................... 711/103; 709/103
 See application file for complete search history.

(56) References Cited

U.S. PATENT DOCUMENTS

| | | | |
|---|---|---|---|
| 6,564,285 B1 | 5/2003 | Mills et al. | |
| 6,574,707 B2 | 6/2003 | Shaw | |
| 7,272,710 B2 | 9/2007 | Radhakrishnan | |
| 7,472,256 B1 | 12/2008 | Nair et al. | |
| 7,562,192 B2 | 7/2009 | Henry et al. | |
| 7,565,494 B1 | 7/2009 | Todd et al. | |
| 8,275,902 B2 * | 9/2012 | Philip et al. | 709/233 |

(Continued)

FOREIGN PATENT DOCUMENTS

| | | |
|---|---|---|
| KR | 2008037385 | 4/2008 |
| KR | 20090111672 A | 10/2009 |

OTHER PUBLICATIONS

GB Combined Search and Examination Report Under Sections 17 & 18(3); dated Aug. 1, 2012; 6 pages.

(Continued)

*Primary Examiner* — Reginald Bragdon
*Assistant Examiner* — Hannah A Faye-Joyner
(74) *Attorney, Agent, or Firm* — Cantor Colburn LLP

(57) ABSTRACT

Embodiments of the invention relate to throttling accesses to a flash memory device. The flash memory device is part of a storage system that includes the flash memory device and a second memory device. The throttling is performed by logic that is external to the flash memory device and includes calculating a throttling factor responsive to an estimated remaining lifespan of the flash memory device. It is determined whether the throttling factor exceeds a threshold. Data is written to the flash memory device in response to determining that the throttling factor does not exceed the threshold. Data is written to the second memory device in response to determining that the throttling factor exceeds the threshold.

7 Claims, 5 Drawing Sheets

(56) References Cited

U.S. PATENT DOCUMENTS

| | | | |
|---|---|---|---|
| 2007/0168603 | A1 | 7/2007 | Takai et al. |
| 2008/0065718 | A1 | 3/2008 | Todd et al. |
| 2008/0222353 | A1 | 9/2008 | Nam et al. |
| 2008/0320228 | A1 | 12/2008 | Brunheroto et al. |
| 2009/0063777 | A1 | 3/2009 | Usui |
| 2009/0106498 | A1 | 4/2009 | Lepak et al. |
| 2009/0193187 | A1 | 7/2009 | Barth, Jr. et al. |
| 2010/0185816 | A1 | 7/2010 | Sauber et al. |
| 2010/0211731 | A1 | 8/2010 | Mittendorff et al. |
| 2010/0281221 | A1 | 11/2010 | Cantin et al. |
| 2010/0306577 | A1 | 12/2010 | Dreifus et al. |
| 2012/0017034 | A1* | 1/2012 | Maheshwari et al. ........ 711/103 |

OTHER PUBLICATIONS

Alan Jay Smith, "Sequential Program Prefetching Memory Hierachies", IEEE Computer Society; Dec. 1978; No. 12; vol. 11; pp. 1-19.

Bekim Cilku et al.; "Towards A Time Predictable Hierarchical Memory Architecture—Prefetching Options to be Explored" ISORCW 13th IEEE International Symposium May 2010, pp. 219-225.

Chang Joo Lee et al.; "Prefetch-Aware DRAM Controllers", 41st IEEE/ACM International Symposium, Nov. 2008; pp. 200-209.

Kevin Lim et al.; "Disaggregated Memory for Expansion and Sharing in Blade Servers"; ISCA '09; Jun. 20-24, 2009; Austin, Texas.

Seongcheol Hong et al; "NAND Flash-based Cache using SLC/MIC Combined Flahs Memory"; 2010 IEEE Computer Society; pp. 21-30.

Tae Ho Kgil; "Architecting Energy Efficient Servers"; pp. 1-138; A dissertation submitted in partial fulfillment of the requirements for the degree of Doctor of Philosophy (Computer Science and Engineering in the University of Michigan 2007.

Verivue, Inc.; "Optimizing Flash Memory for Content Delivery Platforms"; 2008-2009; pp. 1-6.

Wei-Fen Lin et al.; "Reducing DRAM Latencies with an Integrated Memory Hierarchy Design"; HPCA 7th International Symposium; Jan. 2001; pp. 301-312.

Leibson, Steve "What is a Flash cache?" Denall Memory Blog; dated Apr. 26, 2010, downloaded from: http://web.archive.org/web/20100510005138/http://www.denali.com/ . . . ; downloaded Apr. 7, 2013; 4 Pgs.

* cited by examiner

OPTIMIZED FLASH BASED CACHE MEMORY

CROSS-REFERENCE TO RELATED APPLICATION

This application is a continuation of U.S. patent application Ser. No. 13/112,894, filed May 20, 2011, the contents of which is incorporated by reference herein in its entirety which. U.S. patent application Ser. No. 13/112,894 is related to U.S. patent application Ser. No. 13/112,601, filed May 20, 2011, the contents of which are hereby incorporated by reference in its entirety.

BACKGROUND

The present invention relates generally to memory, and more specifically, to using a flash device as a cache memory.

Flash memory devices are a type of non-volatile storage devices that can be electrically erased and reprogrammed in large blocks. Flash memory devices store information in an array of memory cells made from floating-gate transistors. Single-level cell (SLC) flash memory devices store one bit of information in each cell. Multi-level cell (MLC) flash memory devices can store more than one bit per cell by choosing between multiple levels of electrical charge to apply to the floating gates of its cells. Flash memory devices have a limited lifetime because they can only support a finite number of program-erase (P/E) cycles. Contemporary commercially available flash memory devices are typically guaranteed to support a specified number of P/E cycles before the wear begins to impact the reliability of the storage.

Using flash memory devices as an alternative or supplement to dynamic random access memory (DRAM) and/or to hard disk drives (HDDs) is becoming increasingly attractive as the cost of flash memory decreases and the performance of flash memory increases. From a cost perspective, flash memory is currently about ten times less expensive than conventional DRAM. The lower cost of flash memory allows much larger data sets to be stored without a corresponding increase in the cost of the memory. From a performance perspective, contemporary flash memories currently have about two orders of magnitude higher random read throughput than traditional mechanical drives. One downside to the use of flash memory devices for cache memory is that flash memory devices have a limited life and may not be ideal for storing data subject to a large number of updates.

BRIEF SUMMARY

An embodiment is a method that includes throttling accesses to a flash memory device. The flash memory device is part of a storage system that includes the flash memory device and a second memory device. The throttling is performed by logic that is external to the flash memory device and includes calculating a throttling factor responsive to an estimated remaining lifespan of the flash memory device. It is determined whether the throttling factor exceeds a threshold. Data is written to the flash memory device in response to determining that the throttling factor does not exceed the threshold. Data is written to the second memory device in response to determining that the throttling factor exceeds the threshold.

Another embodiment is a computer program product that includes a computer readable storage medium having computer readable program code embodied therewith. The computer readable program code includes computer readable program code that is configured for throttling accesses to a flash memory device. The flash memory device is part of a storage system that includes the flash memory device and a second memory device. The throttling is performed by logic that is external to the flash memory device. The throttling includes calculating a throttling factor responsive to an estimated remaining lifespan of the flash memory device. It is determined whether the throttling factor exceeds a threshold. Data is written to the flash memory device in response to determining that the throttling factor does not exceed the threshold. Data is written to the second memory device in response to determining that the throttling factor exceeds the threshold.

A further embodiment is a method that includes throttling accesses to a flash memory device. The flash memory device is part of a storage system that includes the flash memory device and a second memory device. The throttling is performed by logic that is external to the flash memory device. The throttling includes calculating a lifespan throttling factor responsive to an estimated remaining lifespan of the flash memory device. In addition, a throughput throttling factor responsive to an estimated maximum throughput of the flash memory device is calculated, along with a maximum throttling factor responsive to the lifespan throttling factor and the throughput throttling factor. It is determined whether the maximum throttling factor exceeds a threshold. In response to determining that the maximum throttling factor exceeds the threshold, at least one of data size throttling, prefetch window size throttling, and usage throttling are performed. Data is written to at least one of the flash memory device and the second memory device in response to the throttling.

A further embodiment is a computer program product that includes a computer readable storage medium having computer readable program code embodied therewith. The computer readable program code includes computer readable program code that is configured for throttling accesses to a flash memory device. The flash memory device is part of a storage system that includes the flash memory device and a second memory device. The throttling is performed by logic that is external to the flash memory device. The throttling includes calculating a lifespan throttling factor responsive to an estimated remaining lifespan of the flash memory device. A throughput throttling factor responsive to an estimated maximum throughput of the flash memory device is also calculated along with a maximum throttling factor responsive to the lifespan throttling factor and the throughput throttling factor. It is determined whether the maximum throttling factor exceeds a threshold. In response to determining that the maximum throttling factor exceeds the threshold, at least one of data size throttling, prefetch window size throttling, and usage throttling are performed. Data is written to at least one of the flash memory device and the second memory device in response to the throttling.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

An embodiment utilizes flash memory as a second level cache in between a dynamic random access memory (DRAM) cache and hard disk drive (HDD) storage. Access to the flash cache memory is controlled and throttled by logic located in a storage controller. Access to the flash cache memory is throttled based on characteristics of the data that is being stored (e.g., whether the data accesses are sequential or random, the size of the data). In an embodiment, access to the flash memory cache is completely bypassed when certain data characteristics are detected. By throttling the data at the storage controller level based on data characteristics, a flash device may be used as a second level cache while still ensuring that a stated lifespan of the flash device will be preserved.

Figure 1:
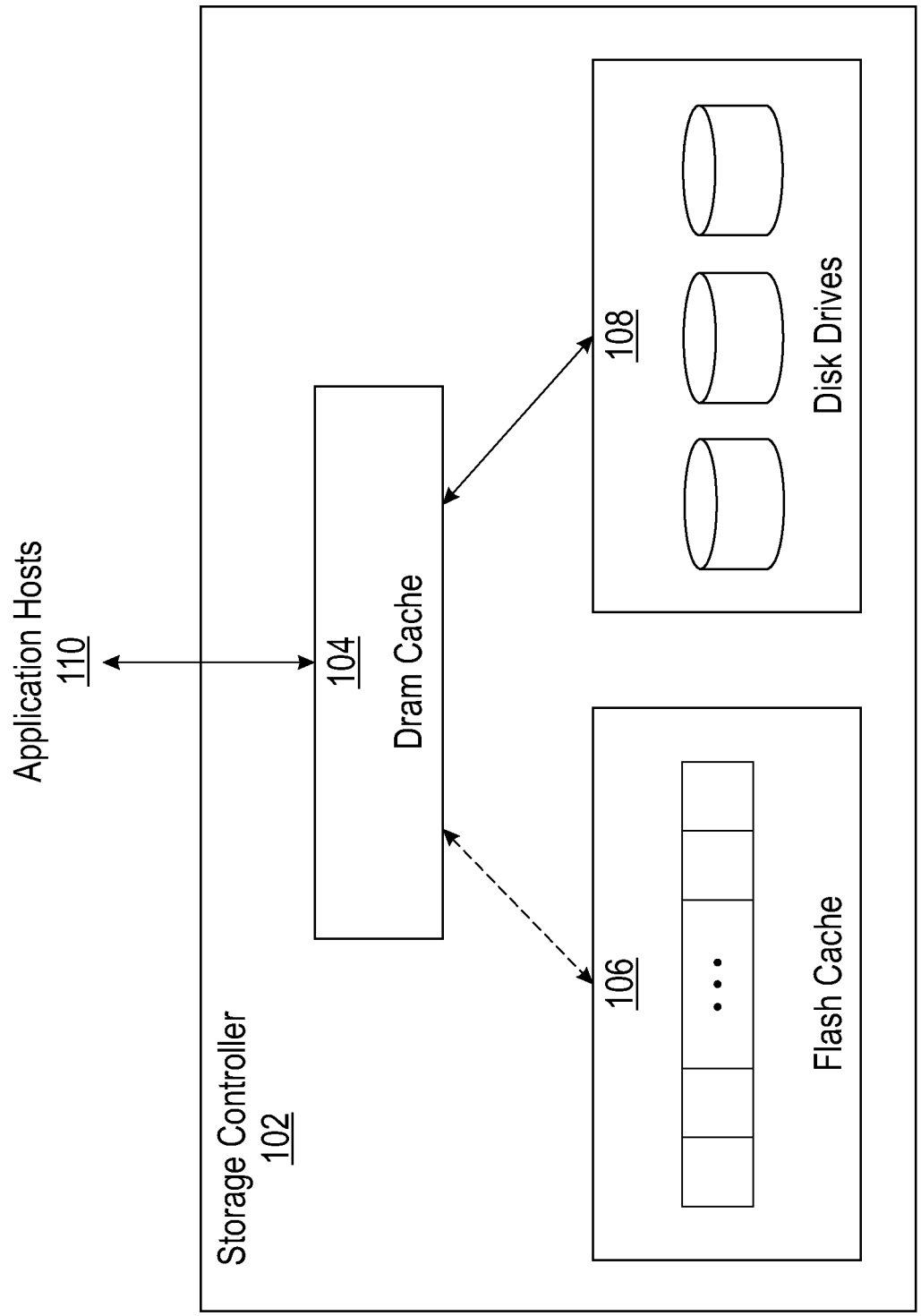
FIG. 1 illustrates a block diagram of a system for providing flash cache memory in accordance with an embodiment.

In an embodiment, such as the one depicted in FIG. 1, a flash cache memory 106 is used as a second level cache in between a DRAM cache memory 104 and disk drives 108. Logic located in the storage controller is utilized to determine where to store data (e.g., to the flash cache memory 106, the DRAM cache memory 104 and/or the disk drives 108) and to track the location of data that was previously stored. The flash cache memory 106 can be used as a read cache and/or as a write cache. When used as a read cache, the flash cache memory 106 is populated with data at the time data is returned from the disk drives 108 to the DRAM cache memory 104 and/or at a later time when the DRAM cache memory 104 evicts unmodified data. For modified data, the DRAM cache memory 104 (e.g., being used as a write cache) has the option of de-staging the data into the flash cache memory 106 rather than into the disk drives 108. When used in this fashion, in addition to absorbing over-writes, a flash cache memory 106 (e.g., being used as a write cache) accumulates a large number of writes, which can later be sorted and destaged to the disk drives 108 in an efficient manner.

In the embodiment of the system shown in FIG. 1, the data flows through the DRAM cache memory 104 and use of the flash cache memory 106 is optional. This allows logic in the storage controller 102 to throttle the amount and type of data being sent to the flash cache memory 106.

A flash device is one example of a limited lifespan memory device that may be implemented by exemplary embodiments described herein. Other limited lifespan memory devices such as, but not limited to: phase change memory (PCM) and other storage class memories (SCMs) may also be implemented by exemplary embodiments.

Traditional DRAM based caching algorithms are primarily concerned with maximizing the hit ratio (or minimizing the miss ratio) of the cache, so as to reduce the number of references to the underlying disk drives. The least recently used (LRU) algorithm, for example, exploits temporal locality in the workload to evict the oldest unreferenced data blocks first. The LRU algorithm has been successfully used reduce the number of misses for both reads and writes. Similarly, data pre-fetching is another technique to improve the hit ratio for reads by exploiting spatial locality in the workload.

Focusing solely on hits and misses, however, may not be optimal for flash based caches. In particular, as opposed to DRAM where endurance is not an issue, flash memory only allows a limited number of writes before it wears out and become unusable. Blindly focusing on hit and miss metrics, may therefore lead to excessive and uncontrolled wearing, making the lifespan of a flash cache short and unpredictable. This shortening of lifespan and unpredictability may be unacceptable for many types of implementations.

Multi-level cell (MLC) flash devices, for example, are currently rated for about five thousand wear cycles, and it would take only a few months to wear out such devices if used as a cache without any throttling. To keep servicing costs low, it would be desirable for a cache for any storage system to have a lifespan of a few years and ideally guaranteed to achieve that lifespan irrespective of the workload.

One approach to tackle the above problem is to make the flash device run slower as it reaches the end of its lifespan. This extends the lifespan of the flash device but at the same time defeats its main purpose of serving as a cache to improve the performance of the system. The presence of a slow flash device used as a cache may in fact, lower the overall performance of the system. Embodiments described herein utilize techniques that avoid situations where the flash cache becomes a performance bottleneck while at the same time guaranteeing a minimum acceptable lifespan.

Embodiments described herein utilize throttling techniques that control the rate of inputs/outputs (I/Os) to the flash cache memory 106 in order to remain below the throughput capacity of the flash device and the network connecting the flash cache memory 106 to the DRAM cache memory 104. This allows the flash device to maintain a minimum guaranteed lifespan. The throughput capacity of the flash device and the network can be determined empirically. This allows a flash control module (FCM) for the flash cache memory 106 (located, in an embodiment, in the storage controller 102) to calculate, at any given time, the percentage of that capacity, p, currently being used. This percentage is used to compute a throughput throttling factor (TTF), which is used by an embodiment to prevent the flash cache memory 106 from becoming a performance bottleneck.

The remaining lifespan of the flash device can be determined in various ways. One option is to use the built-in wear indicator that some manufactures provide for their flash devices. A simple wear indicator is a read-only counter that takes values in the range of one to one-hundred, where a value of one indicates no wearing at all, and a value of one-hundred indicates that the device has reached its maximal number of writes. In the absence of such an indicator, the FCM can calculate the wear by itself by keeping track of the writes to the flash device. In either case, the remaining lifespan of the flash device can be computed. The disparity between the computed remaining lifespan, c, and the desired remaining lifespan, d, forms the basis for a second throttling factor used by an embodiment, referred to herein as a lifespan throttling factor (LTF). The LTF is used to protect the flash device from reaching the end of its lifespan sooner than expected.

For simplicity, in an embodiment both throttling factors (TTF and LTF) take on values from $-\infty$ to 1. For both factors, a negative value indicates that no throttling is required and that data can be sent freely to the flash cache memory 106. A value of 1 indicates that full throttling is required and that no data should be sent to the flash cache memory 106. A value between 0 and 1 indicates that some throttling needs to be applied to the flash cache memory 106, depending on the specific value of the throttling factors.

In an embodiment, for the TTF, a threshold of 90% is chosen as the throughput capacity above which throttling will be applied. This is defined as follows: $TTF=(p-90)/(100-90)$. Similarly, for the LTF a threshold of 10% above the desired remaining lifespan is chosen, and for values below that threshold throttling is applied. This is defined as follows: $LTF=(1.1d-c)/1.1d$. Any threshold number can be implemented by an embodiment, and the thresholds may be programmable based on implementation specific requirements. In another embodiment, these thresholds are chosen to be more conservative for a write cache than for a read only cache, since in a read only cache, the data is protected by the copy on the HDD, and the implementation can run closer to the end-of-life of the flash device without risking data loss. In another embodiment, where a mixed, read/write cache is implemented, as the higher throttling factors are approached, flash cache memory 106 is dynamically split into a read and write portion, and faster wear out is permitted in the read portion than in the write portion. This embodiment takes advantage of the fact that media errors in the read portion will foretell the expected behavior in the write portion and allow advance notice of end-of-life of the device.

Figure 2:
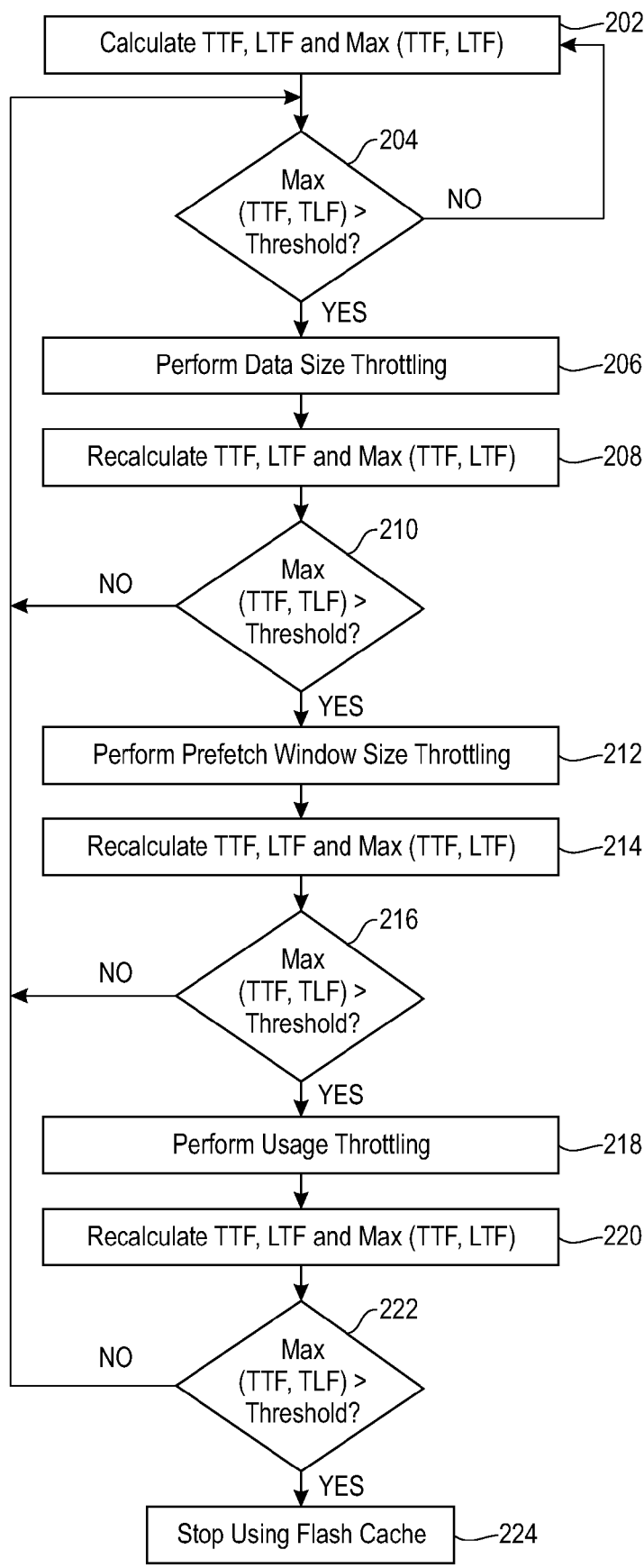
FIG. 2 is process flow for throttling a rate at which data is written to a flash cache memory in accordance with an embodiment.

FIG. 2 is an overall process flow for throttling a rate at which data is written to the flash cache memory 106 in accordance with an embodiment. In an embodiment, the process flow is implemented by logic in the storage controller 102.

Figure 3:
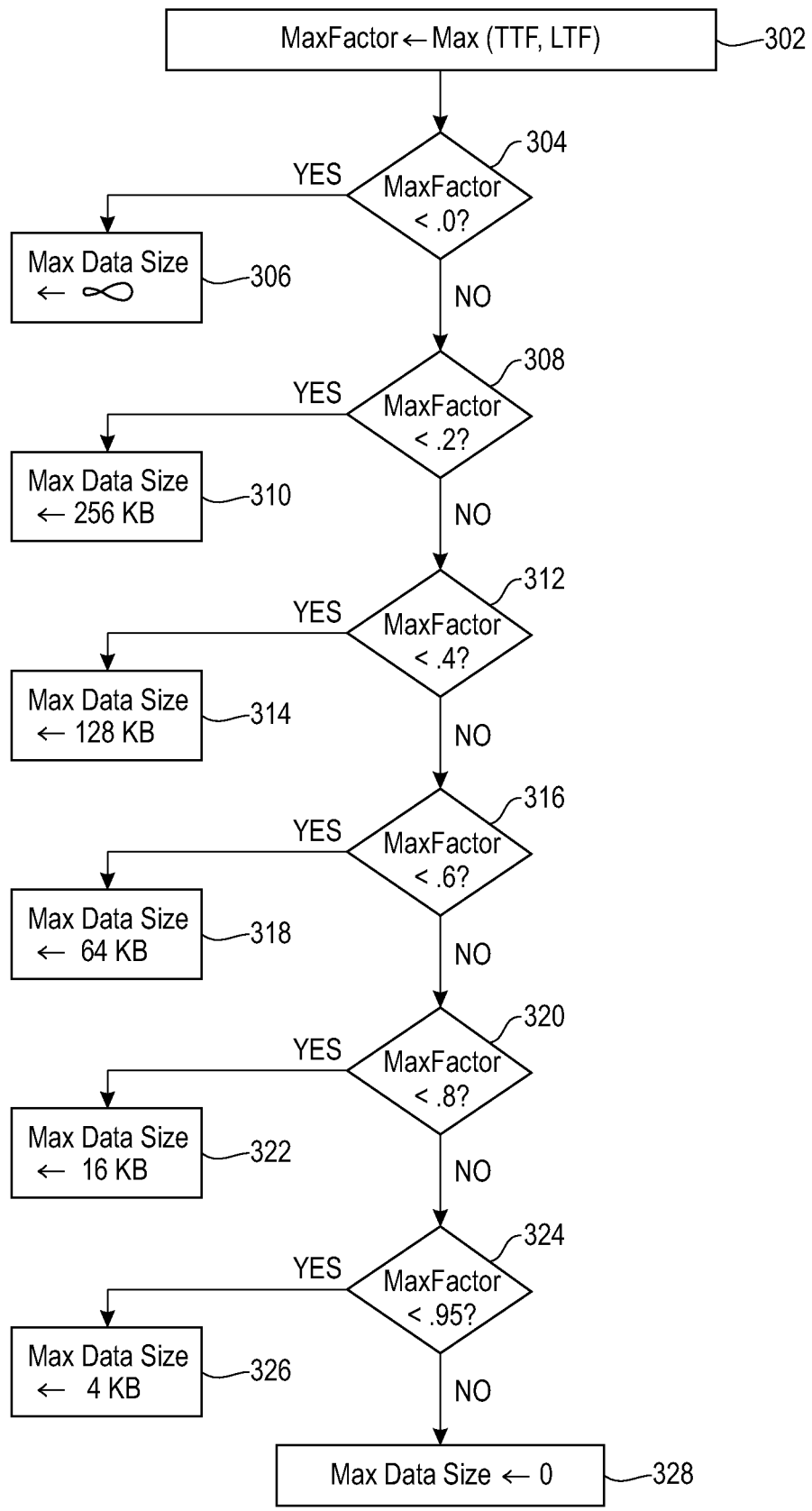
FIG. 3 is a process flow for throttling a rate at which data is written to a flash cache memory based on a data size in accordance with an embodiment.

At block 202, the TTF, LTF and maximum (TTF, LTF) are calculated. At block 204, it is determined if the maximum of (TTF, LTF) is larger than a specified threshold. If the maximum (TTF, LTF) is not above the specified threshold, then the process loops back to 204 because throttling is not required. If, it is determined at block 204 that the maximum (TTF, LTF) is above the specified threshold, then block 206 is performed. At block 206, data size throttling is performed to limit the amount of data that is stored in the flash cache memory 106 based on the size of the data and the maximum (TTF, LTF). An embodiment of a data size throttling process is shown in FIG. 3. In an embodiment, the data size throttling process at block 206 is performed for a specified number of iterations and/or for a specified amount of time. Next, block 208 is performed and TTF, LTF and maximum (TTF, LTF) are recalculated. At block 210, it is determined if the data size throttling process is providing sufficient throttling by comparing the maximum (TTF, LTF) to a specified threshold. If the maximum (TTF, LTF) is not above the specified threshold, then processing continues at block 204.

Figure 4:
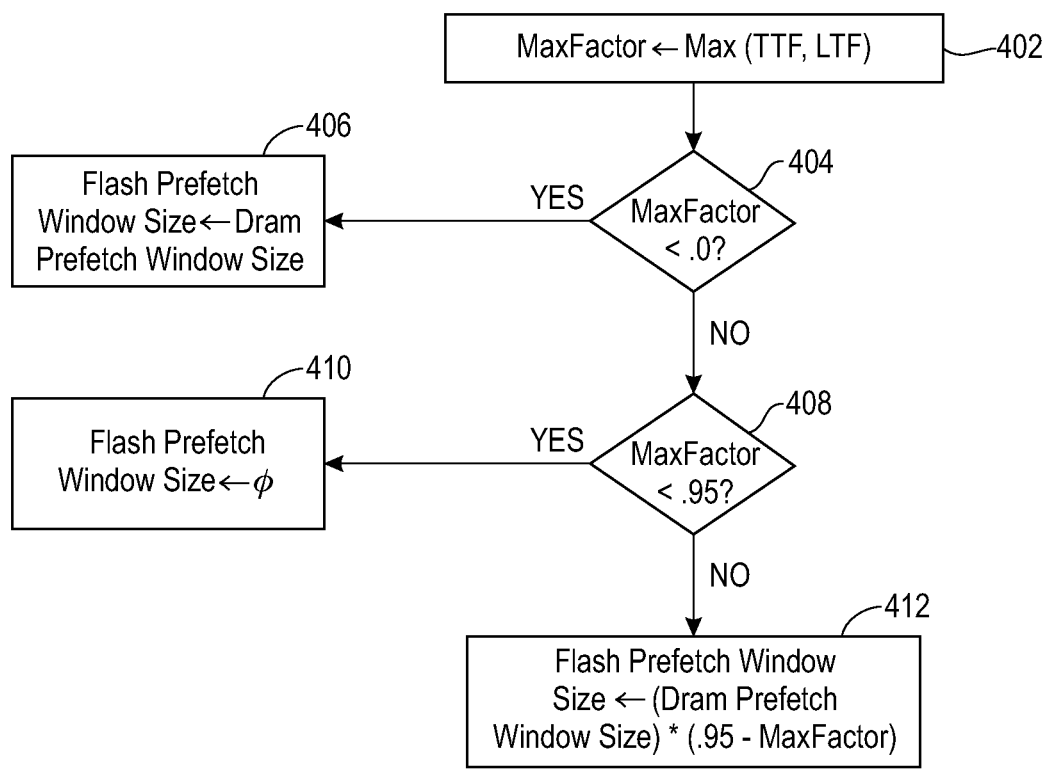
FIG. 4 is a process flow for throttling a rate at which data is written to a flash cache memory based on a prefetch window size in accordance with an embodiment.

If it is determined at block 210, that the maximum (TTF, LTF) is above the specified threshold, then processing continues at block 212 where prefetch window size throttling is performed. An embodiment of a prefetch window size throttling process is shown in FIG. 4. In an embodiment, the prefetch window size throttling process at block 212 is performed for a specified number of iterations and/or for a specified amount of time. Next, block 214 is performed and TTF, LTF and maximum (TTF, LTF) are recalculated. At block 216, it is determined if the prefetch window size throttling process is providing sufficient throttling by comparing the maximum (TTF, LTF) to a specified threshold. If the maximum (TTF, LTF) is not above the specified threshold, then processing continues at block 204. In another embodiment, processing continues at block 212 and the process loops back to 212 for a specified number of iterations and/or for a specified amount of time before looping back up to block 204.

Figure 5:
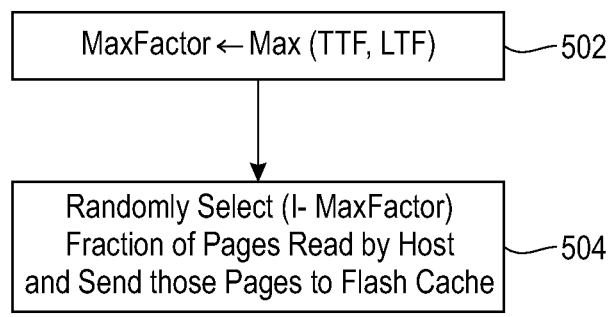
FIG. 5 is a process flow for throttling a rate at which data is written to a flash cache memory based on a data usage in accordance with an embodiment.

If it is determined at block 216, that the maximum (TTF, LTF) is above the specified threshold, then processing continues at block 218 where usage throttling is performed. An embodiment of a usage throttling process is shown in FIG. 5. Usage throttling handles the scenario in which the values of the TTF, or the LTF, or both, grow quickly and un-proportionally even under well behaved workloads. This may stem from certain physical characteristics of the flash device that cannot be anticipated in advance, and may lead to a scenario in which the flash cache memory 106 becomes an instant bottleneck and/or reaches its end-of-life much sooner than expected. Under such conditions even setting the flash prefetch window size to 0 (which means that only the originally requested data is sent to the flash cache memory 106) may not suffice.

In an embodiment, the usage throttling process at block 218 is performed for a specified number of iterations and/or for a specified amount of time. Next, block 220 is performed and TTF, LTF and maximum (TTF, LTF) are recalculated. At block 222, it is determined if the usage throttling process is providing sufficient throttling by comparing the maximum (TTF, LTF) to a specified threshold. If the maximum (TTF, LTF) is not above the specified threshold, then processing continues at block 204. In another embodiment, processing continues at block 212 (or block 218) and the process loops back to 212 (or block 218) for a specified number of iterations and/or for a specified amount of time before looping back up to block 204. If the maximum (TTF, LTF) is above the specified threshold, then block 224 is performed and the use of the flash cache memory 106 is stopped. The system continues to use the DRAM cache memory 104 along with its default caching algorithms communicating solely with the disk drives 108 and bypassing the flash cache memory 106.

In an embodiment, after a specified amount of time and/or a specified number of accesses, processing continues from block 224 to block 202 to see if the flash cache memory 106 can be used for a current workload. In an embodiment, the throttling processes shown in FIG. 2 are performed in a different order. In another embodiment, the maxfactor is compared to different values. In a further embodiment, a subset of the throttling processes shown in FIG. 2 is performed. In a still further embodiment, additional or different throttling processes than those shown in FIG. 2 are performed. For example, certain workloads or volumes could be preferably throttled, or some hints from the applications could be used in deciding what data is important to send to flash and what can be throttled.

FIG. 3 is a process flow for throttling a rate at which data is written to a flash cache based on a data size in accordance with an embodiment. In an embodiment, the process flow is implemented by logic in the storage controller 102.

The process flow depicted in FIG. 3 avoids polluting the flash cache memory 106 with large blocks of data emanating from sequential reads or writes. In an embodiment, these large blocks of data are sent directly from the DRAM cache memory 104 to the disk drives 108. Not writing the sequential workloads to the flash cache memory 106 is advantageous for several reasons. First, sequential workloads have little locality and therefore do not take advantage of the cache. In addition, the sequential performance of conventional disk drives is comparable to that of flash devices and is unlikely to be improved through caching and may even worsen. Further, sequential workloads may cause much wear to flash devices.

In the embodiment shown in FIG. 3, throttling is performed and a size threshold is set. Data sizes below the threshold are sent from the DRAM cache memory 104 to the flash cache memory 106, and data sizes above the threshold are sent directly to the disk drives 108. The threshold can be static or dynamic or based on the throttling factors as in the embodiment shown in FIG. 3.

Referring to FIG. 3, at block 302, the maximum value of the TTF and the LTF is assigned to the variable "maxfactor." In an embodiment, the process flow in FIG. 3 is called from the overall process flow depicted in FIG. 2 where the TTF and the LTF have been calculated. In another embodiment, part of the processing in block 302 includes calculating the TTF and the LTF. At block 304, it is determined if the maxfactor is less than 0. If the maxfactor is less than 0, processing continues at block 306, where the maximum data size is set to infinity (i.e., all data is sent to the flash cache memory 106). If it is determined at block 304, that the maxfactor is not less than zero, processing continues at block 308 to determine if the maxfactor is less than 0.2. If the maxfactor is less than 0.2, processing continues at block 310, where the maximum data size is set to 256 kilobytes (KB). Thus, only data that is less than 256 KB in size is sent to the flash cache memory 106 from the DRAM cache memory 104, and data larger than 256 KB in size is sent from the DRAM cache memory 104 to the disk drives 108. If it is determined at block 308, that the maxfactor is not less than 0.2, processing continues at block 312 to determine if the maxfactor is less than 0.4.

Processing continues at block 314 if the maxfactor is less than 0.4 to prevent access to the flash cache memory 106 for data sizes over 128 KB and to block 316 if the maxfactor is not less than 0.4. At block 316, it is determined if the maxfactor is less than 0.6. Processing continues at block 318 if the maxfactor is less than 0.6 to prevent access to the flash cache memory 106 for data sizes over 64 KB and to block 320 if the maxfactor is not less than 0.6. At block 320, it is determined if the maxfactor is less than 0.8. Processing continues at block 322 if the maxfactor is less than 0.8 to prevent access to the flash cache memory 106 for data sizes over 16 KB and to block 324 if the maxfactor is not less than 0.8. At block 324, it is determined if the maxfactor is less than 0.95. Processing continues at block 326 if the maxfactor is less than 0.95 to prevent access to the flash cache memory 106 for data sizes over 4 KB and to block 328 if the maxfactor is not less than 0.95. At block 328, all data is prevented from being written to the flash cache memory. Thus, all memory is written directly from the DRAM cache memory 104 to the disk drives 108.

Other embodiments where accesses to the flash cache memory 106 are throttled based on data size have different maximum data size values corresponding to the same maxfactor values, different maxfactor values corresponding to different maximum data size values, fewer maxfactor values, or more max factor values. In another embodiment, the processing depicted in FIG. 3 loops back up to block 302 after blocks 306, 310, 314, 318, 322, 326 and 328 to recalculate the TTF, LTF and maxfactor for each data access. In a further embodiment, the TTF, LTF and maxfactor are recalculated on a periodic basis or in response to a condition being detected that may have an impact on the factors (e.g., a certain number of accesses to the flash cache memory 106).

In another embodiment, the smallest value of the maximum data size is greater than zero.

In a further embodiment, the above throttling thresholds (maxfactor and maximum data sizes) are chosen differently for data that is written (modified) vs. data that is read (unmodified). It may be advantageous to throttle the unmodified data first or more aggressively than the modified data, as throttling the modified data has a direct negative impact on overall performance.

FIG. 4 is a process flow for throttling a rate at which data is written to a flash cache based on a prefetch window size in accordance with an embodiment. In an embodiment, the process flow is implemented by logic in the storage controller 102.

The process depicted in FIG. 4 limits the amount of prefetching performed for data stored to the flash cache memory 106 on random reads. In an embodiment, prefetching waits for a read miss to occur, and then fetches into the cache, in addition to the requested blocks of data, one or more additional blocks that are spatially adjacent to the requested block. The number of additional blocks (or the size of the additional blocks) is referred to herein as the prefetch window. In another embodiment, a variable block size is utilized (with a size equal to the prefetch window size), with larger cache blocks than originally requested fetched into the cache.

In an embodiment of the flash based cache described herein, data is fetched to the DRAM cache memory 104 first, and then from the DRAM cache memory 104 the data is sent to the flash cache memory 106. In the process flow shown in FIG. 4, the amount of prefetched data that is sent to the flash cache memory 106 is throttled. In the embodiment shown in FIG. 4, this is done by decoupling the size of the DRAM cache memory prefetch window (or prefetch block size) from that of the flash cache memory prefetch window (or prefetch block size).

Referring to FIG. 4, at block 402, the maximum value of the TTF and the LTF is assigned to the variable "maxfactor." In an embodiment, the process flow in FIG. 4 is called from the overall process flow depicted in FIG. 2 where the TTF and the LTF have been calculated. In another embodiment, part of the processing in block 402 includes calculating the TTF and the LTF. At block 404, it is determined if the maxfactor is less than 0. If the maxfactor is less than 0, then processing continues at block 406, where the flash cache memory prefetch window size is set to the DRAM flash cache memory prefetch window size. Thus, no throttling is performed based on prefetch window size.

If the maxfactor is not less than 0, processing continues at block 408 wherein it is determined if the maxfactor is less than 0.95. If the maxfactor is less than 95, then processing continues at block 410 where the flash cache memory prefetch window size is set to 0. Thus, no data is prefetched for the flash cache memory 106. If the maxfactor is less than 0, processing continues at block 412, where the flash cache memory prefetch size is set to be equal to (DRAM cache memory prefetch size) multiplied by (0.95-maxfactor). Thus, the prefetch window size varies depending on the value of the maxfactor.

In other embodiments where access to the flash cache memory 106 is throttled based on a prefetch window size, a different maxfactor threshold is used to restrict prefetches to the flash cache memory 106. In other embodiments, a percentage different than 0.95 is used in the calculation in block 412. In another embodiment, the processing depicted in FIG. 4 loops back up to block 402 after blocks 406, 410, and 412 to recalculate the TTF, LTF and maxfactor for each data access. In a further embodiment, the TTF, LTF and maxfactor are recalculated on a periodic basis or in response to a condition being detected that may have an impact on the factors (e.g., a certain number of accesses to the flash cache memory 106). In other embodiments, the above throttling thresholds (maxfactor and flash prefetch window size) are chosen differently for data that is written (modified) vs. data that is read (unmodified).

FIG. 5 is a process flow for throttling a rate at which data is written to a flash cache based on a data usage in accordance with an embodiment. In an embodiment usage throttling is performed by randomly selecting a subset of the originally requested pages that reside in DRAM cache memory 104 and only sending the selected subset of the originally requested pages to the flash cache memory 106. The selection can be made using fixed probabilities (e.g., randomly select 50% of the pages to send to the flash cache memory 106) or by using dynamic probabilities as described below. Note that randomly dropping unmodified data does not lead to data inconsistency, as a copy of the data is always present on the hard disk. For modified data, the data cannot be simply dropped, but is simply written to the disks in the case when the throttling logic indicates that the flash cannot accept those modified data. Furthermore, an embodiment where pages are chosen probabilistically has the added property that pages that are accessed multiple times will eventually enter the flash cache memory 106.

Referring to FIG. 5, at block 502, the maximum value of the TTF and the LTF is assigned to the variable "maxfactor." In an embodiment, the process flow in FIG. 5 is called from the overall process flow depicted in FIG. 2 where the TTF and the LTF have been calculated. In another embodiment, part of the processing in block 502 includes calculating the TTF and the LTF. At block 504, a fraction of the pages read by the host are randomly selected to be sent to the flash cache memory 106. In the embodiment shown in FIG. 5, the fraction varies based on the current value of the maxfactor and is equal to (1-maxfactor).

In other embodiments, the fraction is set to a different value, such as the absolute value of (0.95-maxfactor). In other embodiments, one fraction is selected for data that is written (modified) and another fraction is chosen for data that is read (unmodified).

The embodiments described above use the maximum value of the TTF and the LTF (i.e., the maxfactor) to determine the amount of throttling to apply to the flash cache memory 106. In other embodiments, just the TTF is used, just the LTF is used, or another factor is used to determine the amount of throttling to apply. In other embodiments, one group of one or more factors and threshold values are used for one throttling process (e.g., data size throttling) and a different group of one or more factors and threshold values is used for another throttling process (e.g., usage throttling). The groups may overlap or be mutually exclusive. Similarly, different groups of factors and threshold values may be used for data that is read and data that is written.

Technical effects and benefits include the ability to use a flash device for cache memory in a memory system while supporting an expected useful life of the flash device and without causing the flash device to become a bottleneck in the memory system. This can lead to an increase in memory system throughput.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   throttling accesses to a flash memory device that is part of a storage system that comprises the flash memory device and a second memory device, the throttling performed by logic external to the flash memory device, the throttling comprising:
   calculating a lifespan throttling factor responsive to an estimated remaining lifespan of the flash memory device;
   calculating a throughput throttling factor responsive to an estimated maximum throughput of the flash memory device;
   calculating a maximum throttling factor responsive to the lifespan throttling factor and the throughput throttling factor;
   determining whether the maximum throttling factor exceeds a threshold; and
   in response to determining that the maximum throttling factor exceeds the threshold, performing at least one of data size throttling, prefetch window size throttling, and usage throttling; and
   writing data to at least one of the flash memory device and the second memory device in response to the at least one of data size throttling, prefetch window size throttling, and usage throttling.

2. The method of claim 1, wherein the flash memory device comprises a cache memory and the second memory device comprises a hard disk drive.

3. The method of claim 1, wherein the performing the data size throttling is responsive to the maximum throttling factor and a size of the data, the performing the data size throttling directing the writing data to the second memory device when the size of the data exceeds a selected size, wherein the performing the data size throttling comprises calculating the selected size responsive to the maximum throttling factor.

4. The method of claim 1, wherein the performing the prefetch window size throttling is responsive to the maximum throttling factor and comprises setting a size of a prefetch window when writing the data to the flash memory device.

5. The method of claim 1, wherein the performing the usage throttling comprises performing a random selection of a fraction of received data to be written to the flash memory device, the fraction responsive to the maximum throttling factor.

6. A computer program product comprising:
   a computer readable storage medium having computer readable program code embodied therewith, the computer readable program code comprising computer readable program code configured for:
   throttling accesses to a flash memory device that is part of a storage system that comprises the flash memory device and a second memory device, the throttling performed by logic external to the flash memory device, the throttling comprising:
   calculating a lifespan throttling factor responsive to an estimated remaining lifespan of the flash memory device;
   calculating a throughput throttling factor responsive to an estimated maximum throughput of the flash memory device;
   calculating a maximum throttling factor responsive to the lifespan throttling factor and the throughput throttling factor;
   determining whether the maximum throttling factor exceeds a threshold; and
   in response to determining that the maximum throttling factor exceeds the threshold, performing at least one of data size throttling, prefetch window size throttling, and usage throttling; and writing data to at least one of the flash memory device and the second memory device in response to the at least one of data size throttling, prefetch window size throttling, and usage throttling.

7. The computer program product of claim 6, wherein:

the performing the data size throttling is responsive to the maximum throttling factor and a size of the data, the performing the data size throttling directing the writing data to the second memory device when the size of the data exceeds a selected size, wherein the performing the data size throttling comprises calculating the selected size responsive to the maximum throttling factor;

the performing the prefetch window size throttling is responsive to the maximum throttling factor and comprises setting a size of a prefetch window when writing the data to the flash memory device; and the performing the usage throttling comprises performing a random selection of a fraction of received data to be written to the flash memory device, the fraction responsive to the maximum throttling factor.

* * * * *